United States Patent Office 3,702,242
Patented Nov. 7, 1972

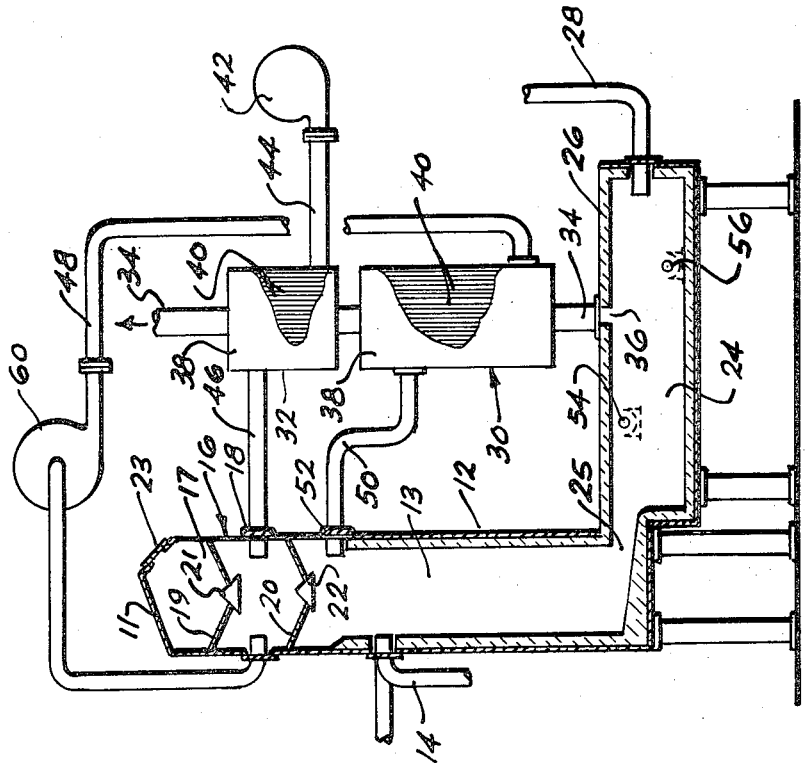
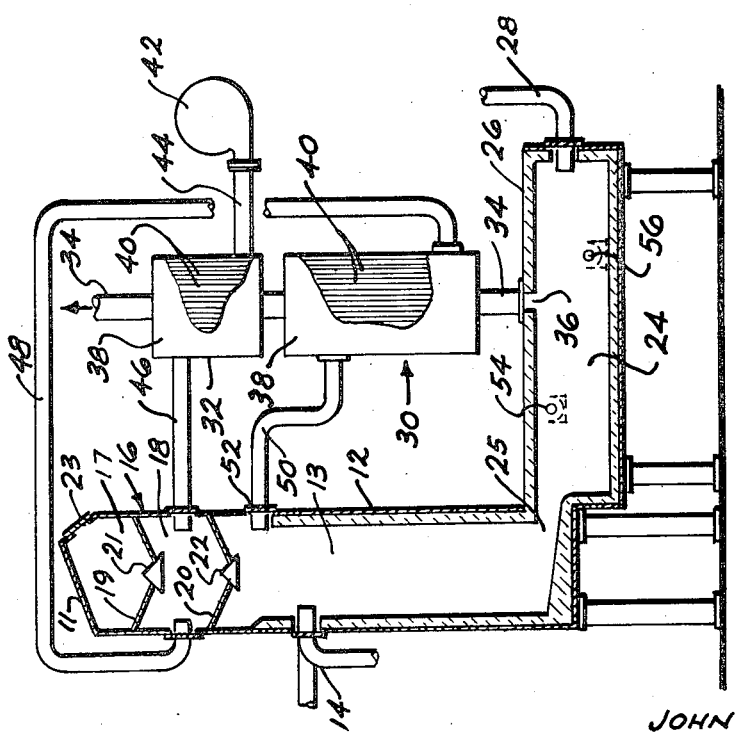

3,702,242
DOWNDRAFT CUPOLA INCORPORATING
MEANS TO PREHEAT THE CHARGE
John Henry Fernandes, Windsor, Conn., assignor to
Combustion Engineering, Inc., Windsor, Conn.
Filed July 21, 1971, Ser. No. 164,730
Int. Cl. C21b 9/14, 11/02, 7/18
U.S. Cl. 75—43                                14 Claims

ABSTRACT OF THE DISCLOSURE

A downdraft cupola organization is disclosed in which means are provided to preheat the charge to the cupola in order to stabilize the level of ignition of the coke bed within the cupola furnace. The charge is preheated by air raised to an elevated temperature by indirect heat exchange with the effluent gas from the cupola. The same air used to preheat the charge is reheated and employed as blast air within the cupola furnace.

BACKGROUND OF THE INVENTION

A shaft furnace for the improved production of cast iron has been developed in which smoke and other harmful air pollutants are capable of removal without the need for expensive ancillary equipment. This apparatus, referred to as a downdraft cupola, is one wherein the tuyeres for delivering air to the furnace are disposed above the charge bed in order that the products of combustion will pass downwardly through the fuel and metallic charge. From the furnace the products of combustion are caused to pass together with the melt into a forehearth where super-heating of the melt can occur, and additionally, the carbon monoxide contained in the gas will be consumed. Such operation, contrary to the operation of conventional updraft cupolas, has the beneficial effect upon pollution abatement of additionally retaining any particulate matter within the bed so that it will not be passed to the atmosphere, but instead will be consumed within the burning charge bed.

Such apparatus has the additional advantage of melting metal more effectively. Because the metallic charge is caused to melt in a zone where free oxygen occurs and thereafter is passed downwardly into a reducing zone other attendant advantages are obtained in that adjustment of the ignition level, and, thereby, close control of the chemical composition of the product can be effected. For example, raising the ignition level with respect to the charge bed will constrict the oxidation zone and extend the reducing zone. The effect of this will be to increase the carbon pickup in the melt with a concomitant reduction in the loss of silicon and manganese therefrom. Alternatively, to lower the ignition level with respect to the charge bed will produce the effect of reducing carbon pickup while increasing the silicon and manganese loss.

A detailed description of apparatus of the type disclosed herein is contained in U.S. Pat. No. 3,186,830, issued June 1, 1965 to Moore et al.

In practice, difficulty is encountered in maintaining stable operating conditions of downdraft cupolas of the described type due to the fact that the level of charge ignition has a tendency to recede downwardly through the charge bed as fresh charge is added. When this occurs heat from an auxiliary burner must be added in order to raise the ignition level to the desired location. Such raising and lowering of the ignition level produces an instability that is undesirable for good system operation due to the disruptive effect it has upon the quality of the metal produced.

It is to the solution of this problem that the present invention is directed.

SUMMARY OF THE INVENTION

According to the present invention means are provided to heat the charge prior to its admission to the interior of the cupola in order to maintain a stable heat balance in the charge bed thereby insuring the stability of the ignition level. A heat exchange system is provided by which air is heated by passing it in heat exchange relation with the combustion gases discharged from the furnace and this, in turn, is employed to preheat the charge. After preheating the charge this air is then reheated in a separate heat exchanger that is connected in series with the first and employed as the blast air in the cupola.

A downdraft cupola employing the present invention advantageously produces a metal of greater quality in that the chemical composition of the metallics contained therein can be more closely controlled. The charge preheating arrangement of the invention additionally enhances the thermal efficiency of the system in that more heat is utilized within the system thus reducing the temperature of the gases issuing from the stack and a reduction in the fuel requirements of the system.

For a better understanding of the invention, its operating advantages and the specific objects obtained by its use, reference should be made to the accompanying drawings which illustrate the preferred embodiments of a cupola furnace system according to the invention and the description that relates thereto.

DESCRIPTION OF THE DRAWINGS

FIG. 1 is a vertical sectional representation of one form of a downdraft cupola organization according to the present invention; and FIG. 2 is a somewhat modified form of the downdraft cupola organization of FIG. 1.

DESCRIPTION OF THE INVENTION

The drawing illustrates in somewhat schematic form a downdraft cupola furnace together with the ancillary equipment that comprises the present invention. The cupola comprises a vertical shaft having a substantially closed top 11 and a refractory or water cooled wall 12 defining a furnace chamber 13. A fuel ignition burner 14 is operatively disposed to fire within the furnace in order to provide initial ignition energy to the charge and also to provide an auxiliary source of heat as may be demanded by the operating conditions within the unit. A charge hopper 16 is provided adjacent the upper end of the furnace from which solid fuel and metallic charge can be periodically supplied to the furnace thereby rendering the unit continuously operable. The charge hopper 16 comprises tandem chambers 17 and 18 which are formed by axially spaced partitions 19 and 20 containing upper and lower bell type closures 21 and 22, as is well known in the art. A pivotal closure 23, or the like, is provided in the cupola top 11 to load charge into the upper chamber 17. The operation of the hereindescribed charge hopper 16 is such that, in order to prevent leakage from the shaft during charging, the charge is first loaded through closure 23 into the uppermost chamber 17. During this phase of charging both of the bell closures 21 and 22 are both closed. After the charge has been loaded into chamber 17 and top closure 23 is closed, the charge can thereafter be transferred to the lower chamber 18 by opening the upper bell closure 21. When it is desired to charge the furnace, the lower bell 22 is opened. In this way, the furnace interior can be continuously maintained under a positive pressure and gas leakage to the atmosphere can be prevented.

A holding furnace or forehearth 24 is provided as a receiver and is located adjacent to, and communicates with, the lower end of the cupola by means of a throat opening 25. The forehearth 24 is similarly provided with a refractory or water cooled wall 26 about its interior surface. An air source 28 is disposed to operate within the forehearth and serves to add combustion air for the ignition of the high temperature gases travelling from the cupola into the forehearth, as well as to provide heat for superheating the molten metal held within the forehearth. According to the present invention, a pair of gas-to-air heat exchangers, indicated as upstream primary heat exchanger 30 and downstream secondary heat exchanger 32, are connected by means of conduit 34 for series flow of effluent gases off the forehearth 24. The conduit 34 communicates with the forehearth 24 at an opening 36 in the wall thereof and conducts the gas through the heat exchangers to a discharge stack (not shown). The heat exchangers 30 and 32 each comprise a generally cylindrical casing 38 enclosing a plurality of tubes 40 arranged for the parallel flow of gas. Air is introduced to the system under pressure by means of a blower 42 and conduit means, 44 through 50, which serve to pass air seriatim through the secondary heat exchanger 32, the lower chamber 18 of charge hopper 16, the primary heat exchanger 30 to tuyeres 52. The disclosed conduit arrangement is a series circuit by means of which air heated in the secondary heat exchanger 32 serves to preheat the metallic charge in the hopper 16, thence is passed to the primary heat exchanger 30 where it is reheated to higher temperature and admitted through tuyere 52 as blast air to the cupola furnace chamber 13.

The hereindescribed cupola system operates as follows. A coke bed is built up in the furnace chamber 13. The burner 14, which may use gas, oil or any combustible fuel, is ignited and the blower 42 is placed in operation. The air source 28 in the forehearth 24 is also placed in operation to burn gases travelling from the cupola 10 into the forehearth. As the coke is raised above its ignition temperature the coke bed burns under the action of the air blown through tuyere 52 while the products of combustion pass into the forehearth where they are ignited and thence passed in series through the heat exchangers 30 and 32 in flowing to the stack. By reason of the heat transfer that occurs in the heat exchanger the combustion gas temperature is reduced first to about 1600° F. at the discharge side of the primary heat exchanger 30 and to about 600° F. exiting the secondary heat exchanger 32 for subsequent discharge from the stack.

Air introduced to the system by the blower 42 is heated to about 1000° F. in the secondary heat exchanger 32 from whence it is circulated in direct heat exchange relation with the metallic charge retained in the lower chamber 18 of hopper 16. Desirably the air at this temperature is capable of preheating the metallic charge such that it will be just below the coke ignition temperature when it is admitted to the furnace chamber 13. After leaving the hopper 16, the air is reheated in the primary heat exchanger 30 to a temperature of about 1000° F. to 1200° F. at which temperature the air enters the furnace through tuyere 52.

When the coke bed and the forehearth are at the desired operating temperature the charge can be admitted to the furnace by opening the lower bell 22 while the upper bell 21 remains closed. As operation of the system proceeds sufficient coke to melt the metallic charge is added to the hopper 16 together with the metallic charge thereby to render system operation continuous.

As the charge melts, molten metal and slag fall through the coke bed and run into the forehearth 24 through the throat opening 25 where it collects and where the metal and the slag may be removed through the respective slag and metal discharge spouts 54 and 56. In flowing through the charge bed the molten metal tends to absorb particulate matter contained in the gases flowing therethrough. The metal is heated to its pouring temperature in the forehearth and the carbon monoxide component of the effluent gas is ignited before being admitted to the heat exchangers and ultimate discharge from the stack.

A detailed description of the various modes of operation and manner of control of a downdraft cupola of the disclosed type is contained in U.S. Pat. No. 3,186,830 referred to above and is deemed unnecessary to be repeated here. What is pertinent is that the interposition of the secondary heat exchanger together with the particular air circulating system of the present organization advantageously provides the downdraft cupola system described in that patent with a stability of operation. By preheating the charge to be admitted to the cupola to a temperature such that it is near ignition temperature when it enters the furnace chamber little or no additional heat need be extracted from the fuel bed to bring the charge up to ignition temperature. In this way, recession of the ignition level within the bed, which is characteristic of the prior system and which deleteriously affected the operation of that system, is eliminated. Moreover, the particular air circulating and heat exchanger system disclosed herein enables the charge to be preheated without the need of supplementary fuel. On the contrary, the imposition of the secondary heat exchanger in the manner disclosed enhances the thermal efficiency of the system by lowering the temperature of the gas passed from the stack. This reduction in stack gas temperature has the added advantage of reducing or, in some cases, eliminating the need to quench the gases prior to their discharge from the stack thereby eliminating the need for equipment to perform this function together with an attendant reduction in system construction and operating costs.

FIG. 2 illustrates an alternative form of the above-described downdraft cupola organization. This embodiment of the invention differs from that of FIG. 1 only to the extent that a supplementary blower 60 is interposed in line 48 of the air circulating circuit between the charge hopper 16 and the primary heat exchanger 30. In this embodiment the blowers 42 and 60 are selected and operatively arranged to impart a balanced draft of about one-half p.s.i. in the hopper 16. By maintaining the hopper in this condition the problem of providing seals to prevent gas leakage into or out of the hopper is kept to a minimum. In all other respects the construction and operation of this form of the invention is the same as that of the FIG. 1 embodiment.

It will be understood that various changes in the details, materials, and arrangements of parts which have been hereindescribed and illustrated in order to explain the nature of the invention, may be made by those skilled in the art within the principle and scope of the invention as expressed in the appended claims.

What is claimed is:

1. The method of continuously melting metal in a substantially vertical shaft furnace having a tuyere at the upper end portion thereof and means for conducting molten metal to a receiver at the lower end thereof, including the steps of:
    (a) establishing a burning bed of solid fuel to occupy the lower portion of the furnace below said tuyere,
    (b) intermittently introducing a series of preheated metal-solid fuel charges to the top of said fuel bed,
    (c) continuously circulating air in successive heat exchange relation with the effluent gases from said furnace and the metal-solid fuel charge prior to its admission to said furnace,
    (d) reheating the air by subsequently passing it again in heat exchange relation with said effluent gases, and
    (e) passing the reheated air to said tuyere for admission to said furnace as blast air.

2. The method as recited in claim 1 wherein the charge admitted to the furnace is preheated to about the ignition temperature of the charge bed.

3. The method as recited in claim 1 wherein the air is reheated to a higher temperature than that at which it preheats the charge.

4. The method as recited in claim 3 wherein the effluent gases from the furnace are passed in heat exchange relation with the air flowing to the tuyere and then with that employed to preheat the charge.

5. The method as recited in claim 1 wherein the air is pressurized initially upon its admission to the system.

6. The method as recited in claim 1 wherein the flow of air in heat exchange relation with the charge is induced followed by pressurizing prior to its admission to the tuyere.

7. The method as recited in claim 1 in which effluent gases from said furnace are ignited in said receiver prior to being passed in heat exchange relation with said air.

8. A downdraft cupola organization for continuously melting metal comprising:
   (a) a vertical shaft furnace defining a chamber for containing a bed of solid fuel and metal charge,
   (b) tuyere means for admitting combustion air to said chamber adjacent the upper end of said charge bed,
   (c) means adjacent the bottom of said chamber for discharging melt and effluent gas therefrom,
   (d) a charge hopper including means for intermittently supplying additional charge to the top of said charge bed,
   (e) a pair of heat exchangers operatively disposed for conducting said effluent gas from said furnace chamber in heat transfer relation with air supplied to the system, and
   (f) conduit means for conducting air seriatim through one of said heat exchangers, said charge hopper, the other of said heat exchangers and thence to said tuyere means.

9. A downdraft cupola organization as recited in claim 8 wherein said charge hopper is disposed integrally with said shaft furnace above said charge bed.

10. A downdraft cupola organization as recited in claim 8 wherein said pair of heat exchangers are arranged for series flow of effluent gas therethrough.

11. A downdraft cupola organization as recited in claim 10 wherein said conduit means includes means connecting the air discharge of the downstream one of said heat exchangers with said charge hopper and the air discharge of the upstream one thereof with said tuyere means.

12. A downdraft cupola organization as recited in claim 8 including a receiver operatively disposed between said furnace chamber and said heat exchangers, said receiver including means for discharging melt therefrom and for conducting effluent gas from said furnace chamber to said heat exchangers.

13. A downdraft cupola organization as recited in claim 11 including blower means disposed in said conduit means upstream in the air flow sense from said downstream one of said heat exchangers.

14. A downdraft cupola organization as recited in claim 11 including blower means interposed in said conduit means between said charge hopper and said upstream one of said heat exchangers.

References Cited

UNITED STATES PATENTS

| | | | |
|---|---|---|---|
| 87,725 | 3/1869 | Swain | 266—27 |
| 114,734 | 5/1871 | Ware | 266—27 |
| 177,029 | 5/1876 | Stephens | 266—27 X |
| 282,266 | 7/1883 | Bull | 75—41 X |
| 2,788,964 | 4/1957 | Schnyder | 75—43 X |
| 3,186,830 | 6/1965 | Moore et al. | 75—43 |
| 2,997,288 | 8/1961 | Schwechheimer et al. | 266—30 |

HENRY W. TARRING II, Primary Examiner

U.S. Cl. X.R.

75—41; 266—27, 30